US006997500B2

(12) United States Patent
Horsford et al.

(10) Patent No.: US 6,997,500 B2
(45) Date of Patent: Feb. 14, 2006

(54) MOTOR VEHICLE SEATING

(75) Inventors: Peter Steele Horsford, Dudley (GB); Andrew Brian French, Coventry (GB); Robert Bostock, Nuneaton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/782,599

(22) Filed: Feb. 19, 2004

(65) Prior Publication Data

US 2004/0160081 A1  Aug. 19, 2004

Related U.S. Application Data

(63) Continuation of application No. PCT/GB02/03754, filed on Aug. 14, 2002.

(30) Foreign Application Priority Data

Aug. 21, 2001  (GB)  ................................. 0120250

(51) Int. Cl.
*B60N 2/02* (2006.01)

(52) U.S. Cl. ..................................... 296/66; 296/65.09
(58) Field of Classification Search ............... 296/66, 296/65.09, 65.05, 69, 65.01, 65.11, 65.16
See application file for complete search history.

(56) References Cited

U.S. PATENT DOCUMENTS

| 2,956,837 | A |   | 10/1960 | Koplin |             |
|-----------|---|---|---------|--------|-------------|
| 3,097,881 | A | * | 7/1963  | Aguilar | ........................ 296/66 |
| 4,227,736 | A | * | 10/1980 | Lebault et al. ........... 296/65.09 |
| 5,482,349 | A | * | 1/1996  | Richter et al. ........... 296/65.09 |
| 5,492,386 | A |   | 2/1996  | Callum |             |
| 6,070,934 | A | * | 6/2000  | Schaefer et al. ......... 296/65.09 |
| 6,129,404 | A |   | 10/2000 | Mattarella |        |
| 6,270,141 | B1 | * | 8/2001 | Moon et al. ............. 296/65.08 |
| 6,582,003 | B1 | * | 6/2003 | Fourrey et al. .......... 296/65.09 |
| 6,598,926 | B1 | * | 7/2003 | Price et al. ............. 296/65.09 |
| 6,702,355 | B1 | * | 3/2004 | Price et al. ............. 296/65.09 |
| 6,767,040 | B1 | * | 7/2004 | Freijy ..................... 296/65.09 |
| 6,793,265 | B1 | * | 9/2004 | Kamida et al. ................ 296/66 |
| 6,817,645 | B1 | * | 11/2004 | Taguchi et al. .......... 296/65.05 |

FOREIGN PATENT DOCUMENTS

| EP | 0 940 288 A2 | 9/1999 |
| GB | 2 344 282 A | 6/2000 |
| GB | 2 347 343 A | 9/2000 |
| GB | 2 355 180 A | 4/2001 |
| GB | 2 374 001 A | 10/2002 |

\* cited by examiner

*Primary Examiner*—Kiran B. Patel
(74) *Attorney, Agent, or Firm*—Gigette M. Bejin

(57) ABSTRACT

A multifunctional third row seating assembly that is capable of moving between two seating positions, as well as moving between split passenger seating configurations and between seating and storage positions. In the storage position, the third row seating assembly forms a true flat floor in combination with a second row seating assembly. The third row seating assembly includes a seat cushion and a seat squab coupled to it and mounted to the vehicle such that the third row seating assembly can be pivoted in an elliptical movement between a forward and a rearward seating position. The third row seat cushion is also latched such that it can be released and flipped over from a front longitudinal axis to fit into a foot rest area of the vehicle. The third row squab can then be folded down to form a flat floor. The third row squab is also constructed in two sections, so that it is capable of forming a bench seat or a split seat.

9 Claims, 13 Drawing Sheets

MOTOR VEHICLE SEATING

CROSS REFERENCE TO RELATED APPLICATIONS

This application is a continuation of PCT International Patent Application No. PCT/GB02/03754 filed on Aug. 14, 2002, which is a continuation of GB 0120250.6, filed on Aug. 21, 2001 and claims benefit thereof.

FIELD OF INVENTION

This invention relates to automotive passenger vehicles and in particular to seats and seating for a motor vehicle having multifunctional capability.

BACKGROUND OF THE INVENTION

Such vehicles include hatchback vehicles, sports utility vehicles (SUVs) and people carriers or multi purpose vehicles (MPVs). In these vehicles the rear seating is used to define the front of a luggage area situated at the rear of the passenger compartment and the rear seating is often able to fold forward to increase the size of the luggage area.

In order to provide customers with increased seating flexibility, a number of vehicles have been designed to accommodate three rows of seating and to provide a number of seating configurations. An example of such a flexible seating arrangement is shown and described in EP-A-0940288. However, when the rear or third row seating is folded a true flat floor is not achieved in this arrangement.

It is known from GB-A-2344282 to provide a seat assembly that is capable of producing a substantially flat floor but this arrangement suffers from the disadvantage that in the folded flat configuration the backrest lies in front of the folded seat cushion which folds forward about a front edge thereof. This requires there to be a large gap in front of the front edge of the seat cushion to allow this folding to occur. U.S. Pat. No. 2,956,837 shows an arrangement where the seat cushion can be folded forward into a folded position and the backrest can be folded with a rearward movement from its normal position into a stowed position in which the backrest lies behind the folded seat cushion However, in this arrangement the backrest moves a substantial distance in order to lie behind an elevated floor section of the vehicle so that there is a substantial gap between the rear edge of the folded seat cushion and the front edge of the stowed backrest. This gap has to be bridged by a specially provided folding shelf which is normally stowed behind the backrest at the front of a luggage compartment behind the seat.

It is an object of the present invention to provide an improved arrangement of multifunctional vehicle seating that is able to produce a flat rear floor when folded.

According to a first aspect of the invention there is provided a foldable seat assembly for a motor vehicle, the seat assembly being movable between a normal passenger seating position and a stowed position and comprising a seat cushion having a an upper seating surface and a base surface, the seat cushion being mounted for pivotal movement about a front transverse axis such that the seat cushion can be folded forward from a normal position corresponding to the normal passenger seating position of the seat assembly into a stowed position corresponding to the stowed position of the seat assembly in which the base surface faces upwards, and a backrest connected to the seat cushion and extending upward from the seat cushion when the seat assembly is in the normal seating position, the backrest having a lower end, an upper end, a front seating surface and a rear surface and being movable from a normal position corresponding to the normal passenger seating position of the seat assembly into a stowed position corresponding to the stowed position of the seat assembly, the lower end of the backrest being arranged to move rearwards as the backrest is moved from its normal position into its stowed position such that, in the stowed position, the backrest lies behind the folded seat cushion, wherein the base surface and the rear surface of the backrest are generally flat and the upper end of the backrest folds forwards as the lower end of the backrest moves rearwards during movement of the backrest from its normal position into its folded position such that, when the seat assembly is in the stowed position, the rear surface of the stowed backrest lies immediately behind the base surface of the folded seat cushion and the rear surface and the base surface are aligned to form a generally flat substantially continuous load bearing surface.

The upper edge of the backrest and a front edge of the seat cushion may be shaped to allow the upper edge of the backrest to nest with the seat cushion when in the stowed position.

The seat assembly may further comprise a position adjustment mechanism arranged to facilitate movement of the seat cushion and backrest between a forward seating position and a rearward seating position. Preferably, the position adjustment mechanism is arranged such that the seat cushion and backrest are lower in the forward seating position than in the rearward seating position. The position adjustment mechanism may include a latching means to selectively latch the seat cushion and backrest in the forward and rearward seating positions.

The seat cushion may be connected to the backrest by a releasable locking means.

The backrest may include a backrest frame assembly comprising a support frame and a pair of support legs, each of the support legs being pivotally connected to the support frame and in use connecting the support frame to a structural part of the motor vehicle. A combination of rotation of the support legs relative to the structural part of the motor vehicle and rotation of the support frame relative to the support legs may be used to produce the rearward movement of the lower end of the backrest.

Each of the support legs may be attached to the structural part of the motor vehicle by means of a support arm forming part of the position adjustment mechanism. The position adjustment mechanism may comprise a pair of front support arms to pivotally connect the seat cushion near to a front edge thereof to the structural part of the motor vehicle and a pair of rear support arms to pivotally connect the support legs to a structural part of the motor vehicle. Conveniently, the seat cushion includes a seat cushion frame to which the front support arms is connected.

The seat assembly may form part of a third row seating. Such third row seating may comprise two separate foldable seat assemblies arranged to form a split bench seat.

According to a second aspect of the invention there is provided a motor vehicle having a roof structure, a floor structure, a front wall, a rear wall and two side walls defining a passenger compartment and two or more rows of seats mounted in the passenger compartment wherein the rearmost of the rows of seats includes at least one foldable seat assembly in accordance with said first aspect of the invention.

The motor vehicle may have three rows of seating, there being a first row seating mounted at the front of the passenger compartment, a second row seating mounted to the rear of the first row seating and a third row seating mounted to the rear of the second row seating.

The motor vehicle may further comprise a luggage space, the rear surface of the backrest of the or each foldable seat assembly, when in the normal seating position, defining a front wall of the luggage space. The length of the luggage space may be increased by moving the or each foldable seat assembly from a rearward position to a forward position. The motor vehicle may further comprise a floor structure and, in the region of the luggage space, a false floor spaced above the floor structure, the lower end portion of each backrest of each foldable seat assembly, when in the stowed position, being located between the false floor and an adjacent portion of the floor structure and each backrest being shaped so as to form in combination with the false floor a generally flat load bearing surface extending from the rear of the passenger compartment to a forward edge of the folded backrest. The false floor may be pivotally connected along a rear edge thereof to allow the false floor to fold upwardly during stowage of the backrest. Alternatively, each backrest, when in the stowed position, may form a flat load bearing surface extending from the rear of the passenger compartment to a forward edge of the folded backrest. The luggage space may include a well which is covered when the or all of the backrests are in the stowed position.

The base surface of the seat cushion of the or each foldable seat assembly, when in its stowed position, is preferably aligned with rear surface of the stowed backrest of that foldable seat assembly.

In one preferred arrangement, the second row seating includes at least one re-configurable seat assembly comprising a seat cushion having a seating surface and a rear surface and a backrest having a seating surface and a back surface and the or each re-configurable seat assembly is movable between a seating position and a stored position wherein, when in the stored position, the back surface of the backrest of the or each re-configurable seat assembly is aligned with a corresponding stowed foldable seat assembly so as to provided a generally flat substantially continuous surface from the rear of the passenger compartment to a forward edge of the backrest of the stowed re-configurable seat assembly. Preferably, when the or each re-configurable seat assembly is in the stored position and a corresponding foldable seat assembly is in the stowed position, the back surface of the backrest of the or each re-configurable seat assembly may be aligned with the corresponding flat base surface of the seat cushion of the foldable seat assembly and the flat rear surface of the backrest of the corresponding foldable seat assembly so as to provided a flat substantially continuous surface from the rear wall of the passenger compartment to a forward edge of the stowed re-configurable seat assembly backrest. The or each re-configurable seat assembly may be further movable from the seating position in which the seat cushion is arranged substantially horizontal and the backrest extends upwards from the seat cushion to a table position in which the backrest is folded forwardly onto the seat cushion to form a raised substantially horizontal surface. The or each re-configurable seat assembly may be movable from the table position to the stored position by movement of the seat cushion and backrest of the re-configurable seat assembly in a downward direction. Each seat cushion may be connected to a structural part of the motor vehicle by a collapsible linkage including a locking mechanism used to hold the seat cushion in a raised position and which when released allows the seat cushion and the backrest to be moved downwards.

The or each re-configurable seat assembly may be movable from the table position to a folded forward position by rotating the folded seat assembly about a transverse axis located near to a front edge of the seat cushion so that the respective seat cushion and backrest are arranged substantially vertically. The second row seating assembly may comprise a centre seat assembly and two outer re-configurable seat assemblies both of which are movable from the table position to the folded forward position.

The or each re-configurable seat assembly may be selectively securable in the seating position towards a rear edge of the seat cushion by a release mechanism and be movable from the table position to the folded forward position by releasing the release mechanism and rotating the seat cushion and the backrest about the transverse axis into the folded forward position.

The re-configurable seat assembly may also be used in vehicles other than those according to the second aspect of the invention.

According to a third aspect of the invention there is provided a method of converting a motor vehicle from a normal seating configuration to a load carrying configuration, the motor vehicle having a passenger compartment in which is mounted a first row seating comprising at least one seat assembly, a second row seating comprising a least one seat assembly having a seat cushion and a backrest having a generally flat back surface, and a third row seating comprising a least one seat assembly having a seat cushion and a backrest, the method comprising the steps of folding forward the seat cushion of the or each seat assembly of the third row seating, moving the backrest of the or each seat assembly of the third row seating to a stowed position in which the backrest lies behind the folded seat cushion, folding forward the backrest of the or each seat assembly of the second row seating onto its respective seat cushion and moving the or each folded seat assembly of the second row seating into a lowered stored position, wherein the backrest of the or each stowed seat assembly of the third row seating has a generally flat rear surface having an upper end and a the lower end and is arranged so that when the backrest is moved from the normal seating position into the stowed position the upper end is folded forwards as the lower end is moved rearwards such that, when the seat assembly is in the stowed position, the rear surface of the stowed backrest lies immediately behind the base surface of the folded seat cushion so that the rear surface and the base surface are aligned, the backrest of the or each seat assembly of the second row seating being aligned with the seat cushion and backrest of the or each stowed seat assembly of the third row seating to produce a generally flat substantially continuous load bearing surface from the first row seating to the rear of the passenger compartment.

BRIEF DESCRIPTION OF DRAWINGS

The invention will now be described by way of example and with reference to the accompanying drawings, of which.

DETAILED DESCRIPTION

Figure 1A:
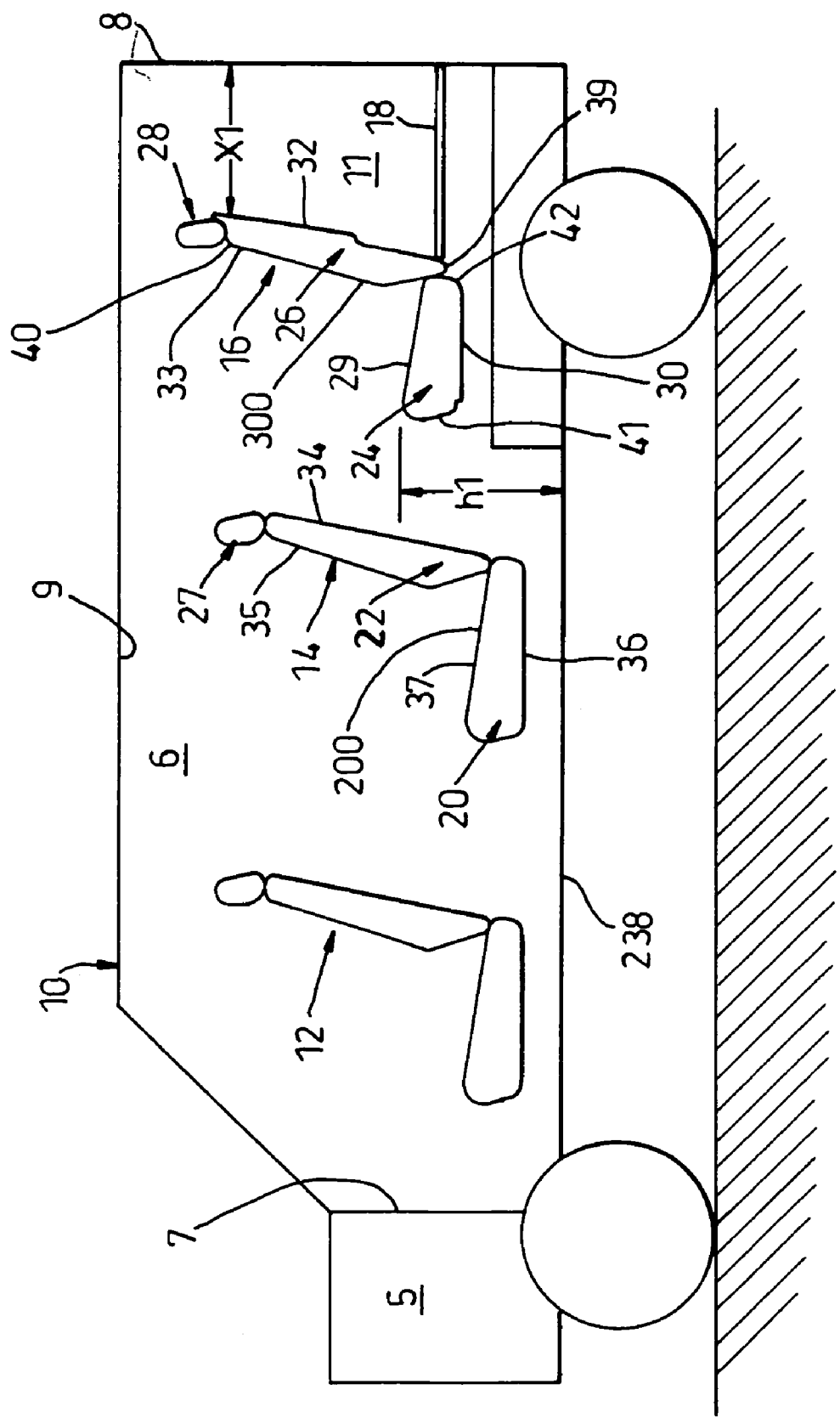
FIG. 1A is a diagrammatic side view of a motor vehicle incorporating the invention, the vehicle having three rows of seating of which the third row seating is shown in a rearward position.
Figure 1B:
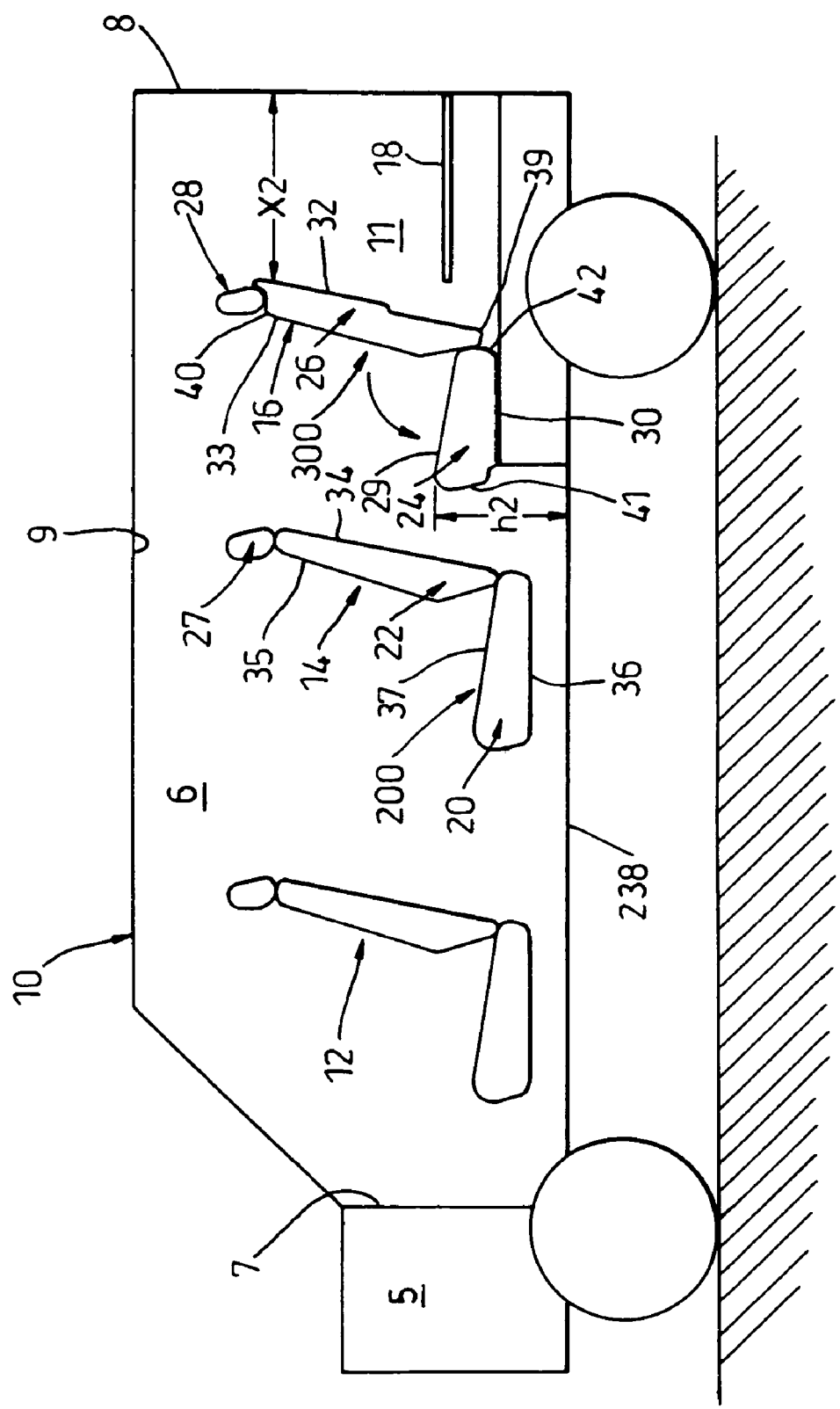
FIG. 1B is view similar to FIG. 1A but showing the third row seating in a forward position.

With particular reference to FIGS. 1A and 1B there is shown a two box motor vehicle 10 having an engine compartment 5 and a passenger compartment 6 in which is mounted three rows of seating. The passenger compartment 6 is defined by a front wall 7, a rear wall 8, a roof structure 9, two side walls and a floor structure 238 which is stepped upwardly towards the rear of the vehicle.

All three rows of seating are mounted for the occupants to face forward, there being a first row seating 12 mounted at the front of the passenger compartment and including the driving position for the vehicle 10, a second row seating 14 mounted to the rear of the first row seating 12 a sufficient distance to enable adults to sit comfortably and a third row seating 16 mounted to the rear of the second row seating 14 a sufficient distance that either adults or children can sit comfortably, as will be discussed below.

It will be appreciated that each row of the seating 12, 14, 16 can comprise one or more seat assemblies. When a single seat assembly is used the seating is generally known as a bench seat and when more than one seat assembly is used these can take the form of individual bucket seats or portions of a split bench seat. While the first, second and third row seating 12, 14 and 16 can be configured as bench or bucket seats, the second and third rows are preferably constructed as split bench seats as described below.

The second row seating 14 is constructed as a split bench seat and comprises three re-configurable seat assemblies 200 each of which includes a seat cushion 20 and a squab or backrest 22. As shown, the second row seating 14 is constructed having two outboard or outer re-configurable seat assemblies and a centre seat assembly that can fold flat but cannot fold or tip forward. However it will be appreciated that all three of the seat assemblies could be re-configurable seat assemblies.

Each seat cushion 20 has a seating surface 37 and a generally flat rigid rear surface or platform 36 and backrest 22 has a seating surface 35 and a generally flat back surface 34. Each backrest 22 is pivotally connected to its respective seat cushion 20 to allow the inclination of the backrest 22 to be adjusted and also to allow the re-configurable seat assembly 200 to be re-configured as will be discussed in greater detail hereinafter. The term flat rigid surface as meant herein is a surface that is flat and which can act as a load bearing surface.

As in the case of the second row seating 14, the third row seating 16 comprises a split bench seat having two separate foldable seat assemblies 300 each of which includes a seat cushion 24 and a squab or backrest 26.

While the backrests for any of the first, second and third row seats could be formed with integral headrests, separate headrests 27 and 28 are shown fitted to the seat assemblies 200, 300 forming the second and third row seating 14 and 16. The headrests 28 mounted to each backrest 26 of the seat assemblies 300 forming the third row seating 16 are mounted such that they can be moved between a deployed or passenger seating position shown in FIGS. 1A to 2B to one of several stowed or storage positions as shown in FIGS. 2C to 2F. The headrest 28 is mounted for pivotal movement along a bottom axis, so that the headrest 28 can easily be swung into the seating position from the storage position and vice-versa. When in the seating position the distance between the headrest 28 and the adjacent backrest 26 is adjustable to provide the correct height.

The seat cushion 24 of each foldable seat assembly 300 has an upper seating surface 29, a front edge 41, a rear edge 42 and a generally flat rigid base surface or platform 30 which is mounted for pivotal movement about a front transverse axis such that the seat cushion 24 can be folded forward from its normal seating position into a stowed position in which the flat base surface 30 is substantially horizontal and faces upwards. The backrest 26 is movably connected to the seat cushion 24 and extends upwards from the seat cushion 24 when the foldable seat assembly 300 is in the normal seating position. The backrest 26 has a lower end 39, an upper end 40, a front seating surface 33 and a generally flat rigid rear surface 32 and is foldable forward from its normal seating position into a stowed position as will be described in greater detail hereinafter.

With particular reference to FIGS. 1A and 1B, there is shown the positioning within the rear of the passenger compartment 6 of a load bearing platform in the form of a false floor 18. The false floor 18 is constructed from a carpet covered metal or rigid plastic cover and is spaced above the floor structure 238 so that a gap or space is defined therebetween. A portion of the space between the false floor 18 and the floor structure may be used to store a spare wheel or tools (not shown). The false floor 18 may be pivotally connected to part of the vehicle body structure along a rear edge to allow the false floor to fold upwards from the position shown. When all of the foldable seat assemblies 300 are in the normal seating position as shown in FIGS. 1A and 1B, the rear surfaces 32 of the backrests 26 form a front wall of a luggage space 11 to the rear of the third row seating 16.

FIGS. 1A and 1B show that the seat assemblies 300 of third row seating 16 are constructed for movement between a rearward seating position, as shown in FIG. 1A, for a 95$^{th}$ percentile passenger and a forward seating position, as shown in FIG. 1B, for a 50$^{th}$ percentile passenger. A position adjustment mechanism (not shown on FIGS. 1A and 1B but described below in relation to FIGS. 8 to 10) is used to fastened the seat cushion 24 and backrest 26 to a structural part of the vehicle 10, in this case the floor structure 238. The position adjustment mechanism allows the seat cushion 24 and backrest 26 to be selectively secured in the forward seating position and in the rearward seating position such that the seat cushion 24 and backrest 26 are lower in the forward seating position than they are in the rearward seating position. The height 'h1' (FIG. 1A) of the seating surface 29 from the floor structure 238 in the rearward seating position is greater than the height 'h2' (FIG. 2A) of the seating surface 29 in the forward seating position.

Thus, the seat foldable assemblies 300 forming the third row seating 16 are movable between at least two positions, one that can accommodate children at one end of the typical passenger size scale and one that can accommodate adults at the other end of the typical passenger size scale. Movement between these two positions is such that each seat assembly 300 moves both forward and down from the rearward seating position to the forward position. This has the effect of making it easier for the feet of a child to touch the floor as well as increasing visibility for the driver when an adult or other larger child is not sitting in the third row seating 16.

The adaptability of the third row seat 16 between forward and rearward positions also increases the cargo carrying flexibility of the vehicle 10 because the length of the luggage space 11 increases when the foldable seat assemblies 300 are moved from the rearward position to the forward position. Referring to FIG. 1A in which the third row seating 16 is shown in the rearward position, the distance 'X1' is the length of the luggage space 11 between the rear surfaces 32 of the seat assemblies 300 and the rear wall 8 of the passenger compartment 6. In FIG. 1B the third row seating assembly 16 is shown in the forward position and the distance 'X2' is the new length of the luggage space 11 between the rear surfaces 32 of the seat assemblies 300 and the rear wall 8 of the passenger compartment 6.

It will be appreciated that 'X2' is greater than 'X1' and that by moving the seat assemblies 300 forward the length and hence the volume of the luggage space 11 has been increased. This is advantageous because it is often the case that the luggage space in a motor vehicle having a conventional three row seating arrangement is relatively small and yet the positioning of the third row seating is further back than it needs to be when used to accommodate small children. Being able to move the third row seating forward not only increases the luggage space but also makes the third row of seats lower and more user friendly for small children. The amount of such forward movement will depend upon the exact arrangement of the seat assembly 300. It will typically be in the range of 100 mm to 150 mm and in the example shown is 120 mm.

Figure 2A:
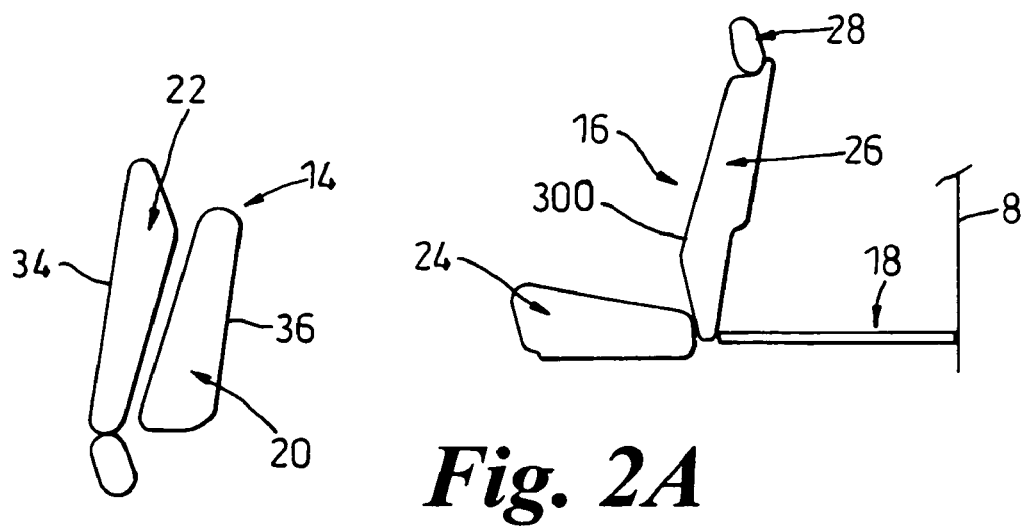
FIGS. 2A to 2F are diagrammatic views based on FIGS. 1A and 1B showing the second and third row seating in a sequence of movements towards and in various seating configurations.

Referring now in particular to FIGS. 2A–2F, there is shown a sequence of views which are provided to illustrate the operation and functionality of the second and third row seating 14 and 16 and in particular how a generally flat substantially continuous load bearing surface can be created. In FIGS. 1A and 1B all three rows of seating are shown in a normal or passenger seating position. In FIG. 2A there is shown a first step in which a left hand outer seat assembly 200 of the second row seating 14 has been folded forward into a "fold and flip" or forward folded storage position. It will be appreciated that all of the seat assemblies of the second row seating 14 could be similarly folded if required. However, only one of the seat assemblies 200 is shown for clarity.

To fold the seat assembly 200 into the folded forward position the backrest 22 is folded forward onto the seat cushion 20 and then a rear edge of the seat cushion 20 is released so that the seat cushion 20 can pivot forward into the position shown in which the seat cushion 20 and the backrest 22 are arranged in a substantially vertical position and the rear surface 36 of the seat cushion 20 faces rearwards and the back surface 34 of the backrest 22 faces forwards.

The folding of the outer seat assemblies is useful to provide better access to the third row seating 16. However this forward folding of the second row seating 14 can also form the first step in a process of converting the seating of the vehicle into two or more improved load carrying configurations as will be described below with reference to FIGS. 2B to 2F.

Figure 2B:
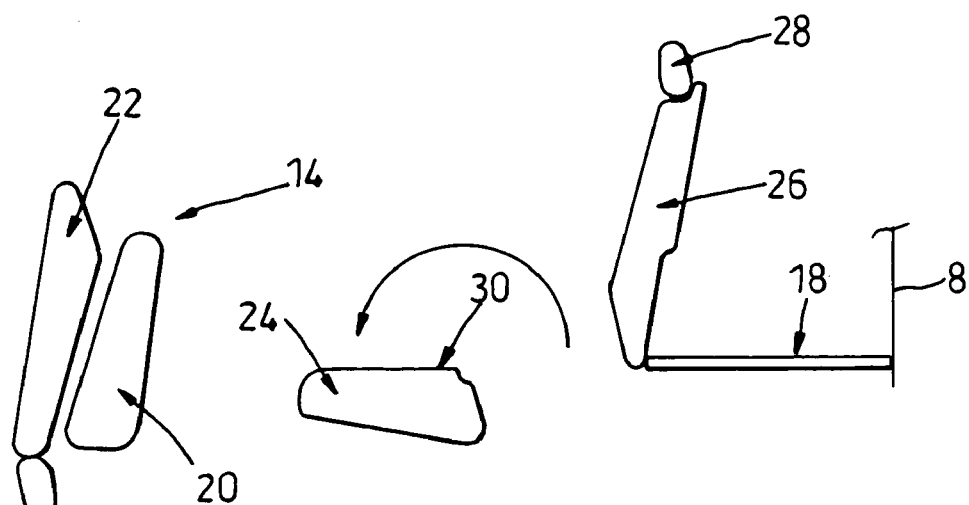

FIG. 2B shows the next step, which is to fold forward or flip over the seat cushions 24 of the third row seating 16 about a front longitudinal axis running along the width of the seat cushion 24. The location of the pivot point is such that, when folded forward into a stowed position, the base surface 30 of the seat cushion 24 is horizontally aligned with the upper surface of the false floor 18.

It will be appreciated that while the seating surface 29 of each seat cushion 24 may be sculpted to provide passenger comfort and conform to the area in front of the third row seating 16 that when in the stowed position, the base surface 30 is a flat and rigid so that it will form a generally flat floor for the vehicle when all of the seat assemblies 300 have been stowed or stored. In this regard, a generally flat floor is one that is sufficiently flat that a person cannot detect any slope in the floor. For example, a slope of 1 to 2 degrees cannot reasonably be detected by a person given the relative lengths possible in automobiles. Also, such a floor might include small recesses, raised portions or fastener heads, handles etc as are frequently required for structural or operational reasons. Thus while the arrangement is capable of forming a true flat floor, the floor does not need to be entirely flat and substantially flat floors fall within the proper scope of the invention.

Figure 2C:
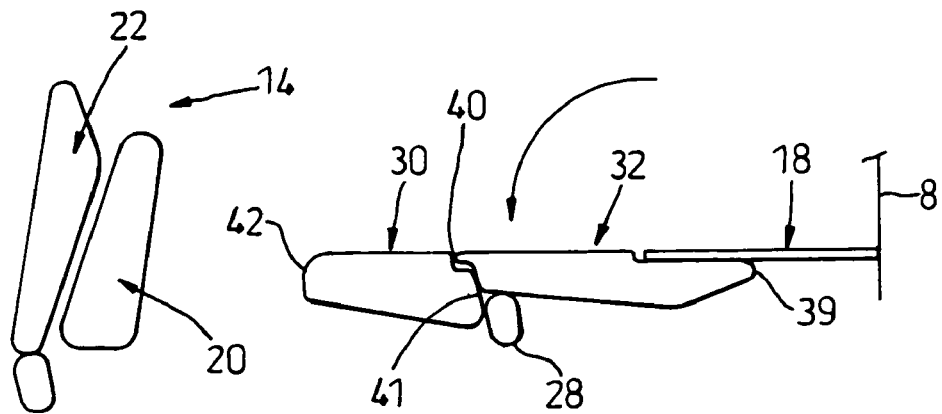

FIG. 2C shows the next step in the process of forming a flat floor. Specifically, the headrests 28 are pivoted into their storage positions and then the backrests 26 are released and folded forward through an arc from their normal seating positions into the stowed position. The lower ends 39 of the backrests 26 move rearwards as the backrests 26 are folded such that, in the stowed position, the backrests 26 lie behind the folded seat cushion 24 and the rear surfaces 32 of the stowed backrests 26 and the base surfaces 30 of the folded seat cushions 24 form in combination a generally flat substantially continuous surface. In the example shown, the upper edge 40 of each backrest 26 and a front edge 41 of each seat cushion 24 are shaped to allow the upper edge 40 to nest with the seat cushion 24 in the stowed position. However, the upper edges 40 of the backrest 26 could simply lie to the rear of the front edge 41 of the seat cushion 24 when the backrest 26 and the seat cushion 24 are in the stowed position.

The folding motion of the backrests 26 is such that a lower end portion 39 of each backrest 26, when in the stowed position, is located between the false floor 18 and an adjacent portion of the floor structure 238. The rear surfaces 32 of the backrests 26 are shaped to form in combination with the false floor 18 and the respective stowed seat cushions 24 a generally flat load bearing substantially continuous surface extending from the rear of the passenger compartment 6 at the rear wall 8 to a forward edge 42 of the complementary folded seat cushions 24. It will be appreciated that the forward edge of each seat cushion 24 is the rear edge 42 of the seat cushion 24 when the seat cushion 24 is in its normal or passenger seating position.

The rearward movement of the backrests 26 is advantageous because in most motor vehicle seating the length of a backrest 26 between its upper and lower ends 39 and 40 is greater than the length of the seat cushion 24 between its front and rear edges 41 and 42. Therefore, if the backrest 26 is merely folded forward about a fixed pivot point, the upper end 40 of the backrest 26 will overlap with the seat cushion 24 and a flat floor will not be produced; see, for example, U.S. Pat. No. 6,129,404. While other backrest constructions may be employed, the arrangement shown in FIG. 2C enables a flat floor to be formed with an adult-sized squab in a way that seeks to make maximum use of the space available and does not require additional panels to bridge any gaps between the folded cushions 24 and the folded backrests 26.

The backrests 26 are mounted for movement such that at least part of the rear surface 32 of each backrest 26 provides an adjoining load bearing platform to the load bearing platforms formed by the false floor 18 and the base surfaces 30 of the stowed seat cushions 24. The term generally flat substantially continuous surface means that there are very small gaps or no gaps between adjoining members forming the flat surface and that the surface is flat as can be discerned by the naked eye. The term load bearing as meant herein relates to the ability of a surface to support a load of the type and nature likely to be carried in the cargo or luggage area of a motor vehicle.

Figure 2D:
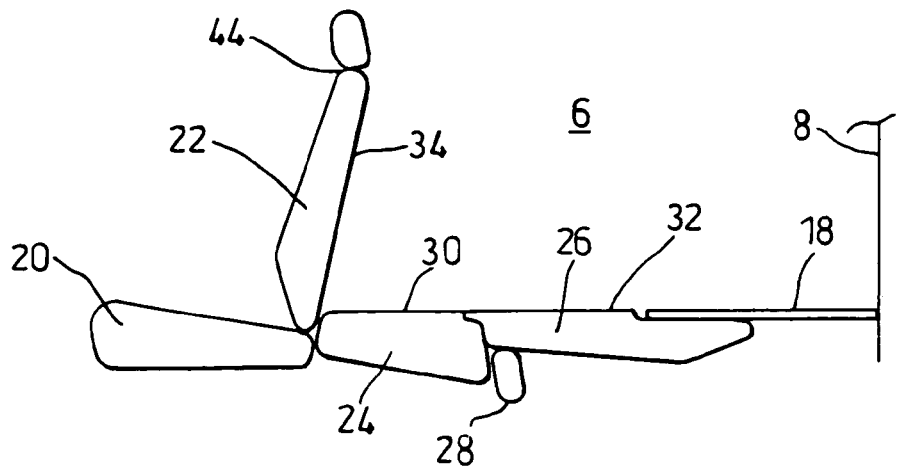

As shown in FIG. 2D, the second row seating 14 can then be redeployed by returning the seat cushions 20 and backrests 22 to their seating positions. It this configuration all of the re-configurable seat assemblies 200 of the second row seating 14 are in their normal or seating position and all of the foldable seat assemblies 300 of the third row seating 16 are in the stowed position. This arrangement provides a good compromise between load carrying and passenger carrying capacity because, as shown, the vehicle 10 is able to carry five persons but has a large luggage space having a generally flat load bearing surface formed by the base surfaces 30 of the seat cushions 24, the rear surfaces 32 of the backrests 26 and the false floor 18. This load bearing surface extends from the rear wall 8 of the passenger compartment 6 to the rear surfaces 34 of the backrests 22 of the seat assemblies 200 forming the second row seating 14.

It will be appreciated that, because the third row seating 16 comprises two separate foldable seat assemblies 300, a further configuration is to fold only one of these into a stowed position so that some seating is still available in the third row. The relative positioning of the second row seating 14 to the third row seating 16 is such that the seat cushions 24 of the third row seating assembly 16 can be flipped or folded forward from their normal seating position to the stowed position regardless of whether the third row seating assembly 16 is in its forward or rearward seating position.

Figure 2E:
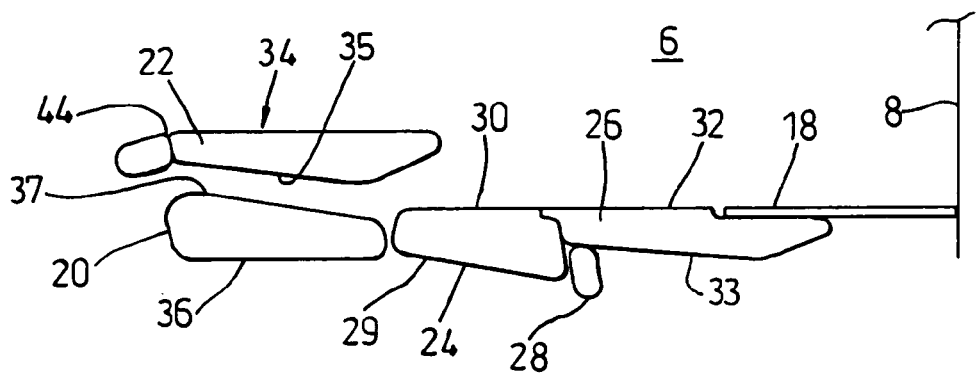

If the vehicle 10 is to be configured for maximum cargo carrying capacity then the seat assemblies 200 of the second row seating 14 are first folded into a table position by folding the backrests 22 forward to lie on the seat cushions 20 as shown in FIG. 2E. This table position, although only an interim stage in the process being described, is also useful in its own right as will be described later. However, it is apparent from FIG. 2E that in the table position the rear surfaces 34 are vertically higher than the remaining flat floor formed by the stowed third row seating 16. Although this arrangement could be used for cargo carrying, it is best viewed as either an interim step in the process towards a maximised load carrying area or a position in its own right for use as a table.

Figure 2F:
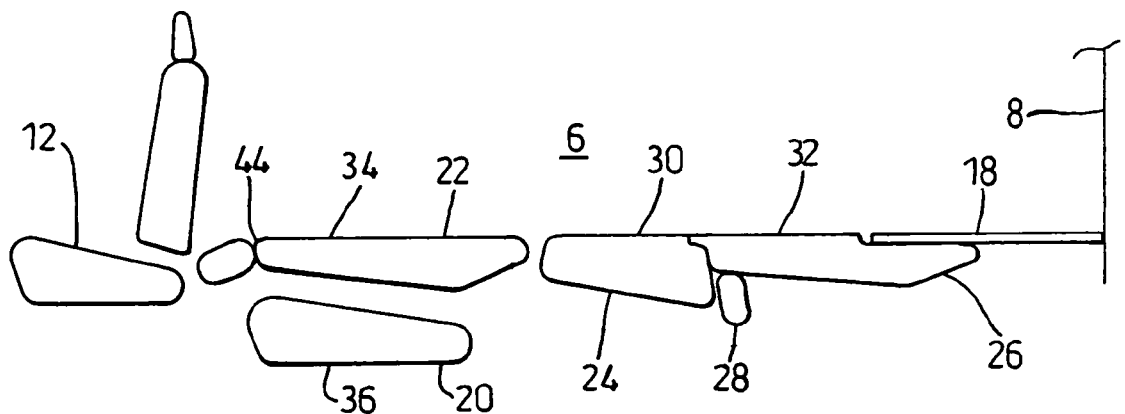

To complete the stowing procedure so as to form the arrangement shown in FIG. 2F, the seat assemblies 200 of the second row seating 14 are moved to a lowered position by pushing down on the backrests 22 and seat cushions 20 which compress by means of a mechanism used to fasten the seat cushions 20 to the floor structure 238. This allows the rear surfaces 34 of the backrests 22 to be aligned with the base surface 30 of the seat cushion 24, with the rear surface 32 of the backrests 26 of the stowed third row seating 16 and with the false floor 18.

When each of the re-configurable seat assemblies 200 is in its stored lowered position, a generally flat substantially continuous surface is produced from the rear wall 8 of the passenger compartment 6 to a forward edge 44 of each of the backrests 22 of the re-configurable seat assemblies 200, the forward edge 44 being the top edge when the backrests 22 are in the normal seating position. It this configuration this continuous load bearing surface extends from the first row seating 12 to the rear wall 8 of the passenger compartment and the load carrying capacity of the motor vehicle 10 is in its maximum state with seating for passengers only on the first row seating 12.

It will be appreciated that, because the second row seating 14 comprises three separate seat assemblies 200, various combinations can be produced between the load carrying capacity of the configurations shown in FIG. 2D and that shown in FIG. 2F by stowing only part of the second row seating 14. Also it is possible to stow only the seating on one side of the vehicle and keep the seating in both the second and third rows in a normal seating position when long but not bulky objects have to be carried and there is still a requirement to carry more than the number of passengers that can be accommodated on the first row seating 12. Thus the re-configurable seating assemblies 200 of the second row seating 14 and the foldable seat assemblies 300 of the third row seating 16 can be arranged in many different combinations to suit different cargo and passenger carrying situations.

Figure 3A:
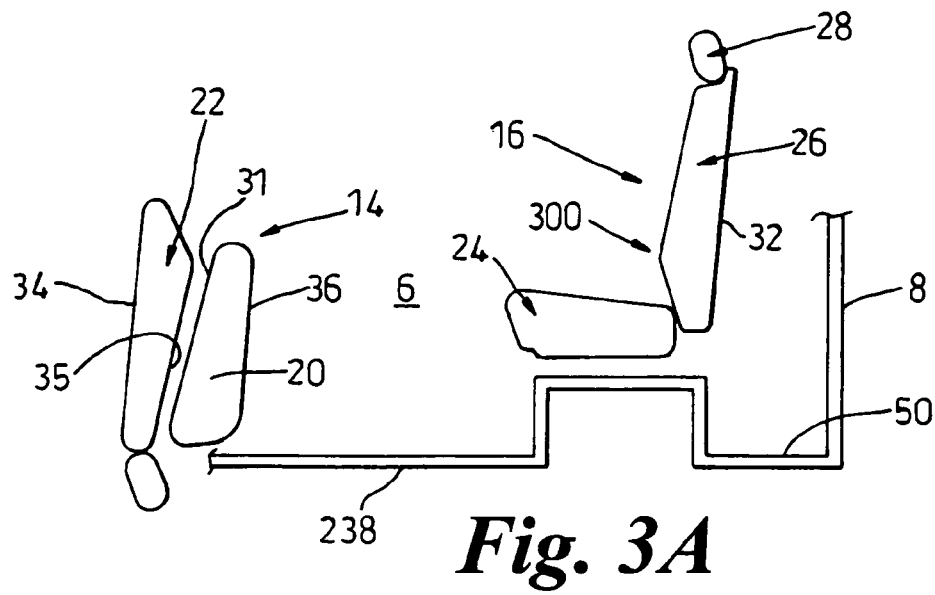
FIG. 3A is a view similar to FIG. 2A but showing an alternative third row seating arrangement.
Figure 3B:
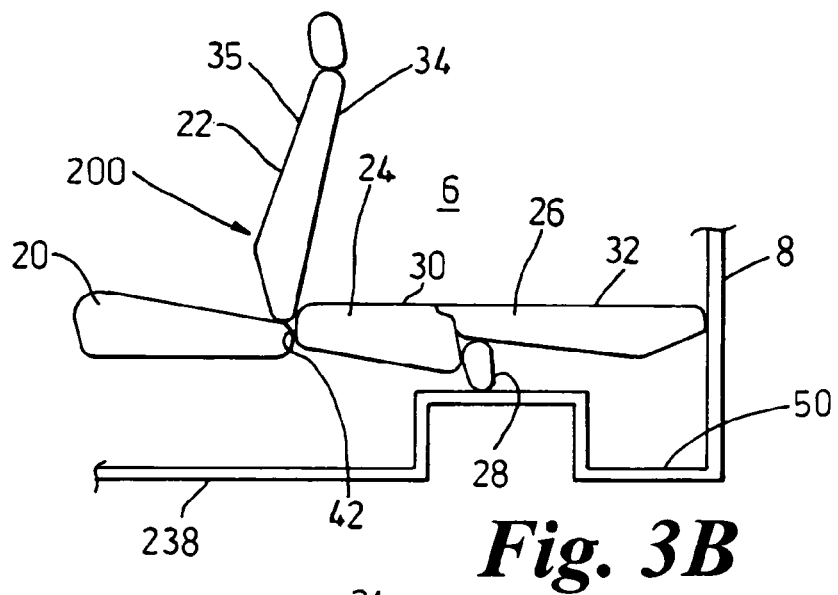
FIG. 3B is a view showing the alternative third row seating arrangement of FIG. 3A in a similar configuration to that of FIG. 2D.
Figure 3C:
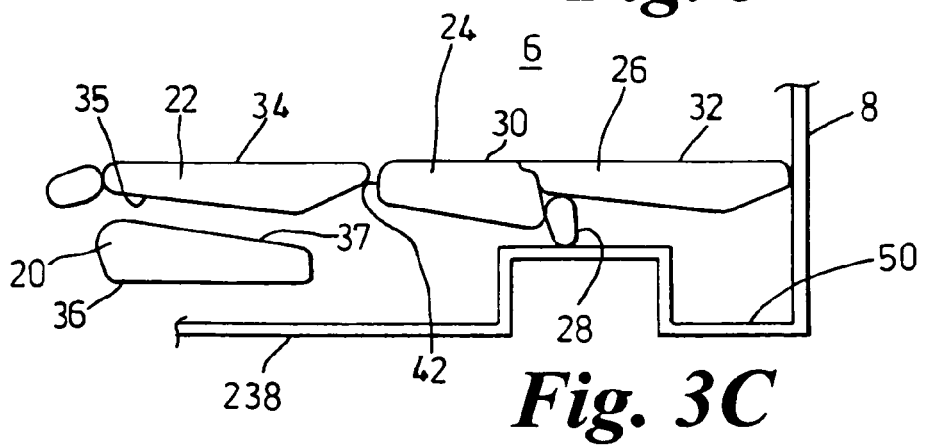
FIG. 3C is a view showing the alternative third row seating arrangement of FIG. 3A in a similar configuration to that of FIG. 2F.
Figure 4:
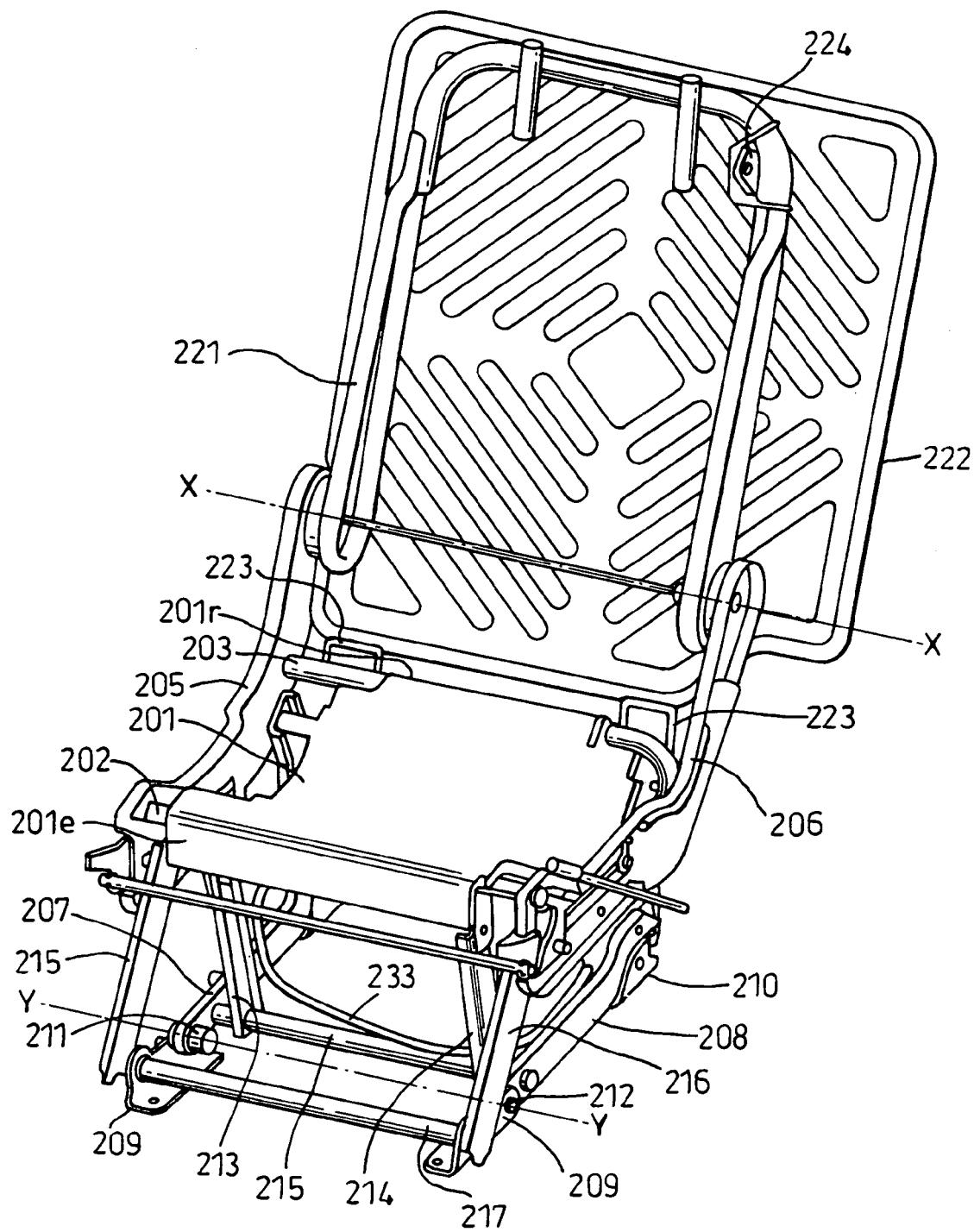
FIG. 4 is a pictorial view of the frame of a re-configurable seat assembly forming part of the second row seating shown in FIGS. 1A to 3C.
Figure 5:
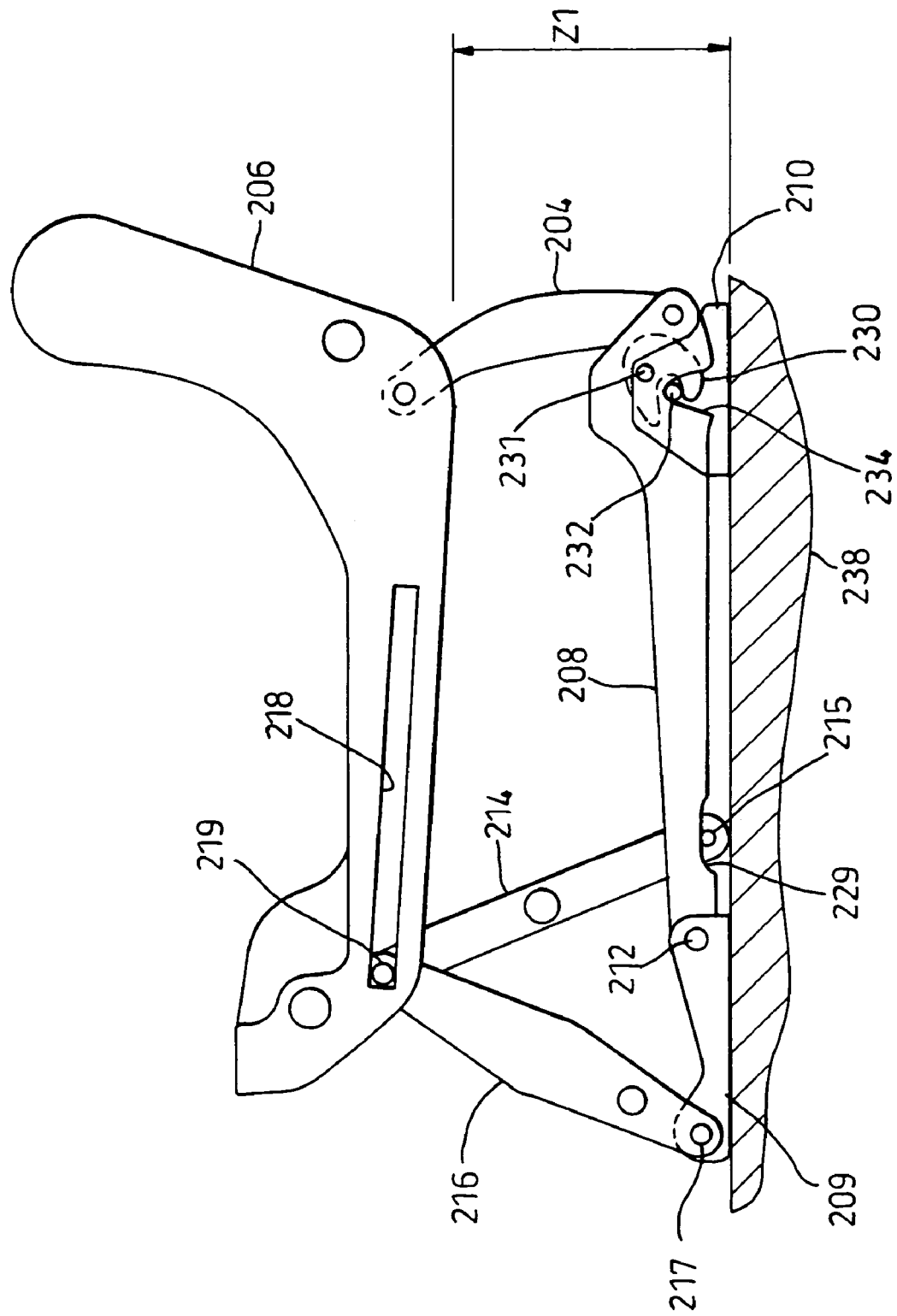
FIG. 5 is a side view of a seat support mechanism forming part of the frame shown in FIG. 4 in a raised position.

With particular reference to FIGS. 3A to 3C there is shown a seating arrangement which is in all significant respects identical to that previously described but which differs in respect of the rear floor structure of the vehicle 10. Like reference numerals will be used and FIG. 3A corresponds to FIG. 2A, FIG. 3B corresponds to FIG. 2D and FIG. 3C corresponds to FIG. 2F. In this arrangement there is no false floor 18 as in the previous arrangement. However, a well or recess 50 is formed in the floor structure 238 adjacent to the rear wall 8 of the passenger compartment 6. Such an arrangement is useful when the height of the passenger compartment 6 is not very great and the length of the luggage space is relatively short. This is because, with a low roof line and a false floor, it may not be possible to stand a large suitcase upright in the luggage space without it fouling the roof structure. Also, if the length of the luggage space is too short to allow the suitcase to be laid down flat the carrying capacity of the vehicle is compromised. By dispensing with the false floor, the distance between the roof structure and the bottom of the well 50 can be sufficient to allow even a large suitcase to be stood upright. In fact the well 50 may, in some cases, be sufficient to allow two suitcases to be stood upright next to one another. Thus the vehicle 10 can still carry substantial pieces of luggage when configured in its maximum seating capacity state as shown in FIGS. 1A and 1B.

As with the arrangement previously described, the second and third row seating 14 and 16 are configurable in various combinations. However there is a slight difference in the folding of the backrests 26 as will be described below. As previously described, the rear surface 32 of the backrest 26 of each foldable seat assembly 300, when in the stowed position, forms in combination with the base surface 30 of the stowed seat cushion 24, a generally flat load bearing surface extending from the rear wall 8 of the passenger compartment 6 to a forward edge 42 of the complementary folded seat cushion 24. In this case the backrests 26 have no false floor to stow under and so merely extend back to the rear wall 8 of the vehicle 10 or, alternatively to a small ledge (not shown) projecting forwardly from the rear wall 8 so that the stowed backrests 26 cover the well 50. When in the stowed position, the third row seating 16 forms a generally flat substantially continuous load bearing surface and the second row seating 14 similarly forms a generally flat substantially continuous load bearing surface that is aligned with the third row seating 16 when both are stowed. In this modified arrangement the rear surface 32 of the backrest 26 can be completely flat since it does not need to be shaped to partially fit below a false floor to provide a flat surface.

Although one way of reconfiguring the seating from the maximum seating to the maximum storage arrangement has been described, it will be appreciated that the seating can be folded in various sequences. For example, the first step may be to forward the seat cushion 24 of the or each seat assembly 300 of the third row seating 16, followed by folding forward the respective backrest 26 so that the backrest 26 lies behind the folded seat cushion 24 in a stowed position. The next step is to forward the backrest 22 of the or each seat assembly 200 of the second row seating 14 onto the respective seat cushion 20 and to move the or each folded seat assembly of the second row seating assembly into a lowered stored position in which the backrest 22 is aligned with the seat cushion 24 and backrest 26 of the or each stowed seat assemblies 300 of the third row seating 16.

With particular reference to FIGS. 4 to 7 there is shown in greater detail a side seat assembly 200 forming part of the second row seating 14. As previously described, the second row seating 14 comprises two or more separate seat assemblies 200 each having a seat cushion 20 and a backrest 22 so that the second row seating 14 can provide greater flexibility. Preferably there are three separate seat assemblies 200 and the second row seating 14 comprises two outer seats representing 35% of the width of the second row and a centre seat representing 30% of the width of the second row. However, other splits and ratios are possible, including a second row having only two separate seat assemblies.

Irrespective of the number of seat assemblies 200 making up the second row they are all similar in construction. Each seat assembly 200 includes a seat pan 201 which is connected to two longitudinally extending upper side rails 205, 206 near to a front edge 201e by a first laterally extending tubular cross-rail 202 and by a second laterally extending tubular cross-rail 203 near to a rear edge 201r. The seat pan 201 is shaped to provide an anti-submarine structure and in use is covered with foam and a fabric or leather covering to form the seat cushion 20 with its soft seating surface 37. Towards a rear end thereof each upper side rail 205, 206 is connected by a rear link 204 to a respective longitudinally extending lower side rail 207, 208, each of which is connected to the floor structure 238 by respective front and rear brackets 209, 210. It will be appreciated that the brackets 209, 210 could be connected to or be part of a sliding seat position adjuster to provide fore and aft movement of the seat assembly 200.

Each lower side rail 207, 208 is pivotally connected to its respective front bracket 209 by a respective pivot pin 211, 212 and is connected to its respective rear bracket 210 by a release mechanism comprising a movable pawl 230 which is pivotally connected to the respective lower side rail 207, 208 by a pivot pin 231 and a locking pin 232 connected to the respective rear bracket 210. The pawl 230 is rotatable from the locked position shown in FIGS. 5 and 6 by a cable 233 to allow the locking pin 232 to escape via a recess 234 in a lower edge of each lower side rail 207, 208. When released, the lower side rails 207, 208 are free to rotate about a transverse axis Y-Y extending through the two pivot pins 211, 212. Each lower side rail 207, 208 is also connected to the adjacent upper side rail 205, 206 in the region of the front edge 201e of the seat pan 201 by a respective seat link 213, 214 which is pivotally connected to the lower side rails 207, 208 by a transversely extending pivot rod 215 trapped in a depression 229 on the lower edge of each lower side rail 207, 208. Upward motion of each seat link 213, 214 is prevented by abutment of the pivot rod 215 with the depression 229 and downward motion is prevented by contact between a lower end the seat link 213, 214 and the floor structure 238.

The front brackets 209 are connected to the upper side rails 205, 206 by respective front links 215, 216 which are pivotally connected at their lower ends to the front brackets 209 by a transversely extending pivot rail 217. The upper end of each front link 215, 216 is slidingly connected to the respective upper side rail 205, 206 by a guide pin 219 which is fastened to the upper end of each link 215, 216 and cooperates with a longitudinally extending slot 218 in the adjacent upper side rail 205, 206 A locking mechanism, not shown, holds the guide pins 219 at the front end of the slots 218 during use of the seat assembly 200 as a seat. When the locking mechanism is released, the guide pins 219 are free to move in the slots 218 thereby allowing the collapsible linkage formed by the front links 215, 216 and the rear links 204 to collapse to permit downward movement of the seat pan 201 from its normally raised position into a lowered position.

Each of the upper side rails 205, 206 is pivotally connected at a rear end thereof to one end of a U-shaped backrest support frame 221. A pressed steel or aluminium backrest panel 222 is fastened to the U-shaped support frame 221 and forms a rigid back for the backrest 22. The rear surface of the backrest panel 222 is, in use, covered with carpet or fabric to form the rigid rear surface 34 and foam and a fabric or a leather covering is placed over the front surface of the backrest panel 222 and the U-shaped support frame 221 to form the seating surface 35 of the backrest 22.

The seat assembly 200 includes integral seat belt fastenings in the form of two D loops 223 on the second laterally extending tubular cross-rail 203 and an upper mounting 224 on the U-shaped support frame 221. This removes the need to disconnect the seat belts from the main structure of the vehicle when the seat assembly is folded.

The backrest 22 is pivotal about an axis X—X with respect to the seat cushion 20 and can be adjusted to a number of varying inclined positions or be released so as to allow the backrest 22 to pivot forwardly onto the seat cushion 20. The seat assembly 200 is show in FIG. 7A in the normal or seating position ready to accommodate a passenger. In this position the lower edge of each of the upper side rails 205, 206 is displaced from the floor structure 238 by a distance 'Z1' to provide the correct vertical displacement of an upper surface of the seat cushion 20 from the floor structure 238 so as to provide a comfortable seating position.

Figure 7A:
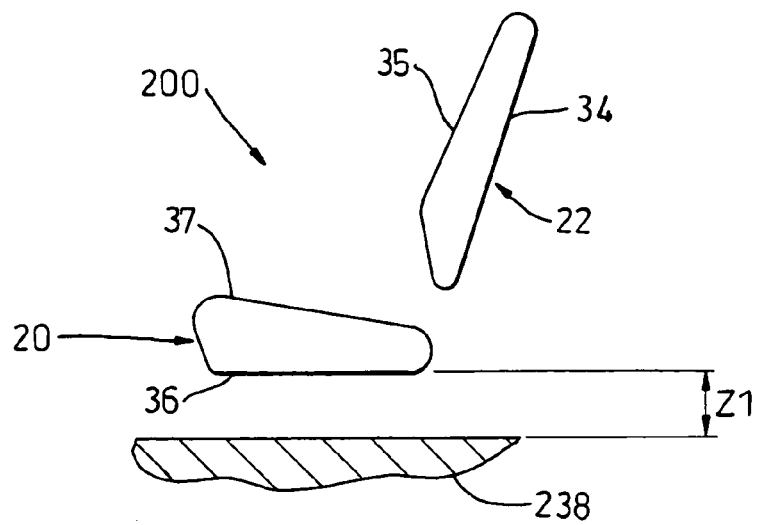
FIG. 7A shows the re-configurable seat assembly which forms part of the second row of seats shown in FIGS. 1A to 3C in a normal or passenger seating position.
Figure 7B:
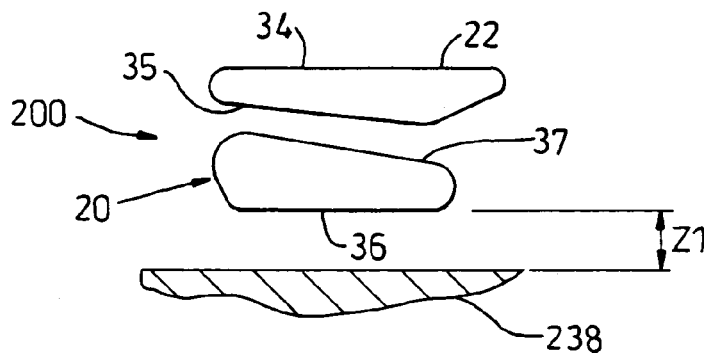
FIG. 7B is a view based on FIG. 7A and shows the re-configurable seat assembly in a table position.
Figure 7C:
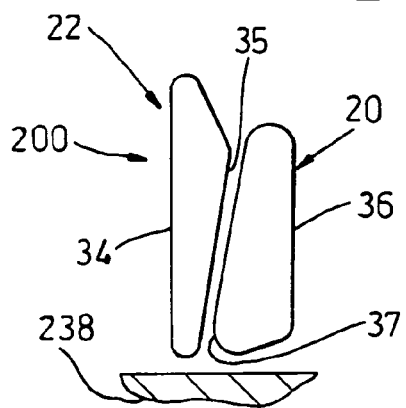
FIG. 7C is a view based on FIG. 7A and shows the re-configurable seat assembly in a folded forward position.
Figure 7D:
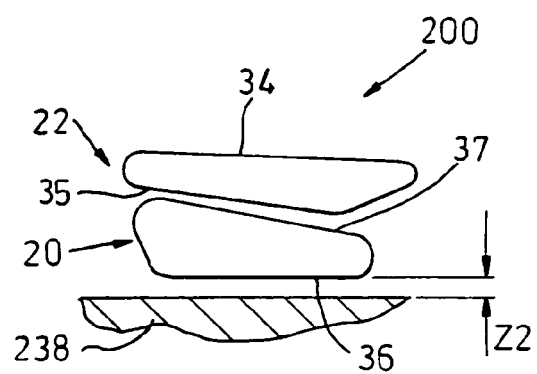
FIG. 7D is a view based on FIG. 7A and shows the re-configurable seat assembly in a folded flat or stored position.

The seat assembly 200 is configurable into three other positions as shown in FIGS. 7B, 7C and 7D. In FIG. 7B the seat assembly 200 is shown in the table position in which the backrest 22 has been released and folded forward so as to lie on the seat cushion 20. In this position the rigid rear surface 34 of the backrest 22 faces upwards and is substantially horizontal and the seat cushion 20 has remained in its normal seating position. In this position the rigid rear surface 34 of the backrest can be used as a table and if desired depressions (not shown) can be formed in the rigid rear surface 34 of the backrest 26 to locate objects such as cups or small items.

In FIG. 7C the seat assembly 200 is shown in the folded forward or flipped forward position. To reach this position from the normal position shown in FIG. 7A, the backrest 22 is first released and folded forward so that the soft front surface 35 of the backrest 22 lies upon the soft front surface 37 of the seat cushion 20. The release mechanism is then released, allowing the lower side rails 207, 208 to be rotated about the transverse axis Y-Y extending through the two pivot pins 211, 212 by lifting a rear edge of the seat cushion 20. The seat cushion 20 can then be folded forward through approximately 90 degrees into the position shown in FIG. 7C in which the rear surface 34 of the backrest 22 faces forward and the rear surface 36 of the seat cushion 20 faces rearward.

Figure 6:
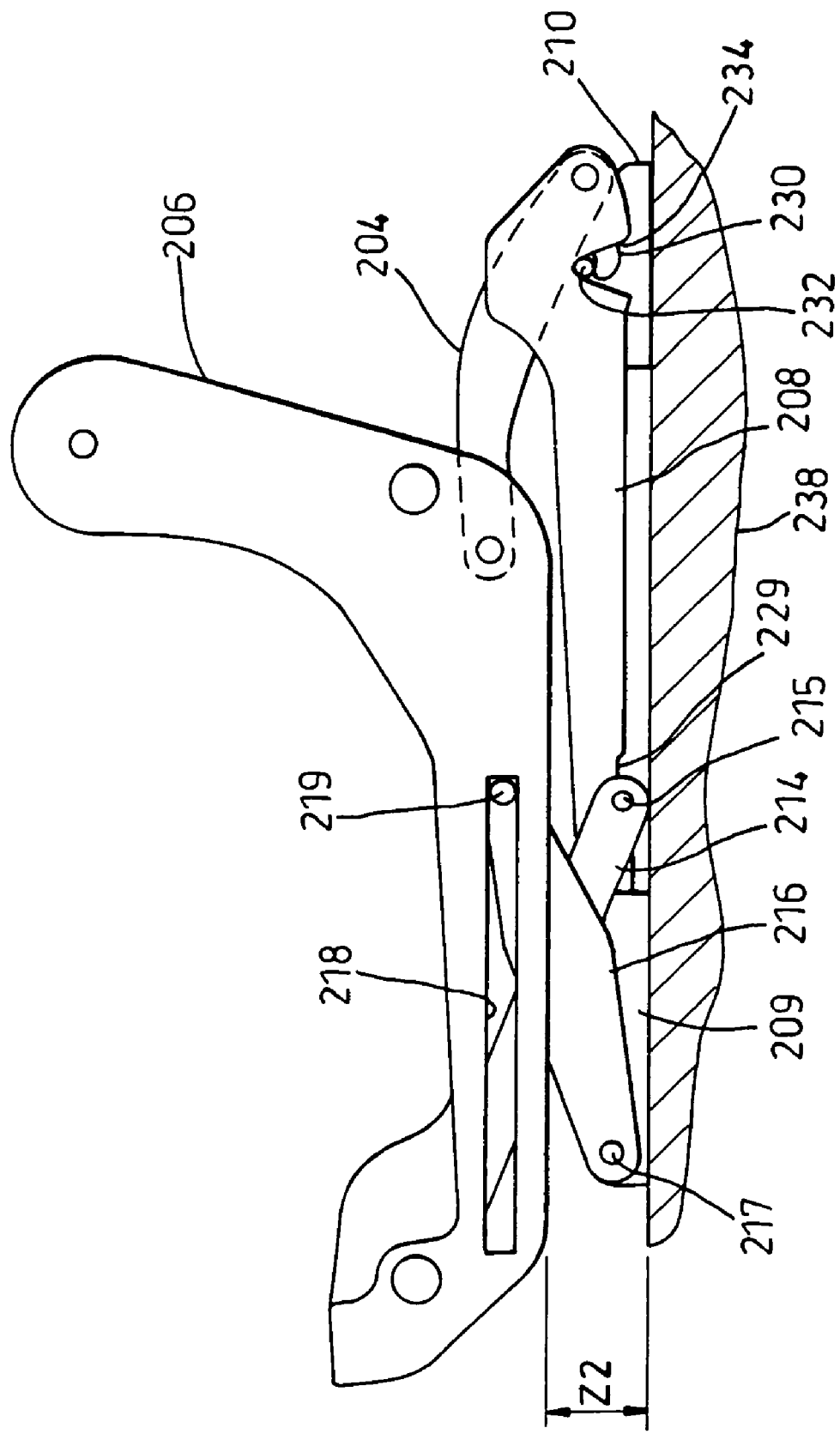
FIG. 6 is a view similar to FIG. 5 showing the seat support mechanism in a lowered or compressed position.

In FIG. 7D the seat assembly 200 is shown in the folded flat or stored position. To reach this position from the normal position shown in FIG. 7A, the backrest 22 is first released and folded forward so as to lie on the seat cushion 20. The locking mechanism used to hold the guide pins 219 at the front end of the slots 218 during normal use of the seat assembly 200 is then released. When a downward pressure is then applied to the rear surface 34 of the folded backrest 22, the guide pins 219 can move in the slots 218 towards a rearward position as shown in FIG. 6, allowing the front links 215, 216 to fold down in a clockwise direction and the seat links 213, 214 to fold forward in an anti-clockwise direction thereby lowering the backrest 22 and the seat cushion 20. In this lowered or stored position the lower edge of each of the upper side rails 205, 206 is spaced a distance 'Z2' from the floor structure 238. The distance 'Z2' is considerably less than the distance 'Z1' and is approximately 150 mm in this example. Thus the rear surface 34 of the backrest 22 is lower than it is in the elevated or table position to be aligned with the upper surfaces of the folded third row seating 16. The seat assembly may also be used advantageously in a vehicle without third row seating, in which case it would be aligned with the rear floor of the motor vehicle when in this configuration.

The inclination of the seat and front links 213, 214 and 215, 216 when the seat assembly 200 is in its normal position helps the application of a vertically downwards force on the seat cushion to produce a folding action once the locking mechanism has been released. However, helper springs could be employed to move the links from a more vertical inclination. Also, electric or other motor actuation could be used.

Figure 8:
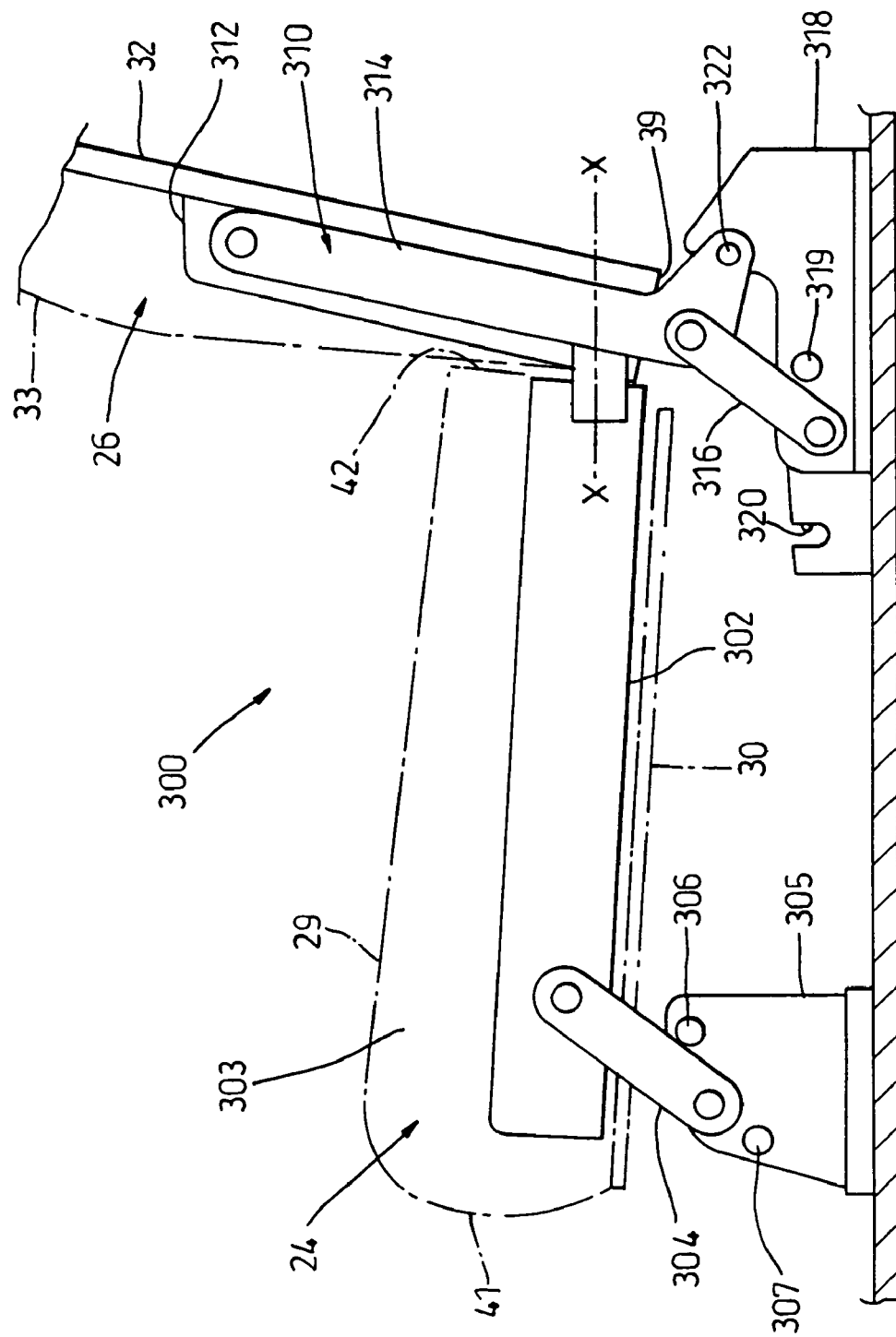
FIG. 8 shows in diagrammatic form a seat support mechanism and seat cushion frame forming part of a foldable seat assembly of the third row seating shown in FIGS. 1A to 3C and in a rearward seating position.
Figure 9:
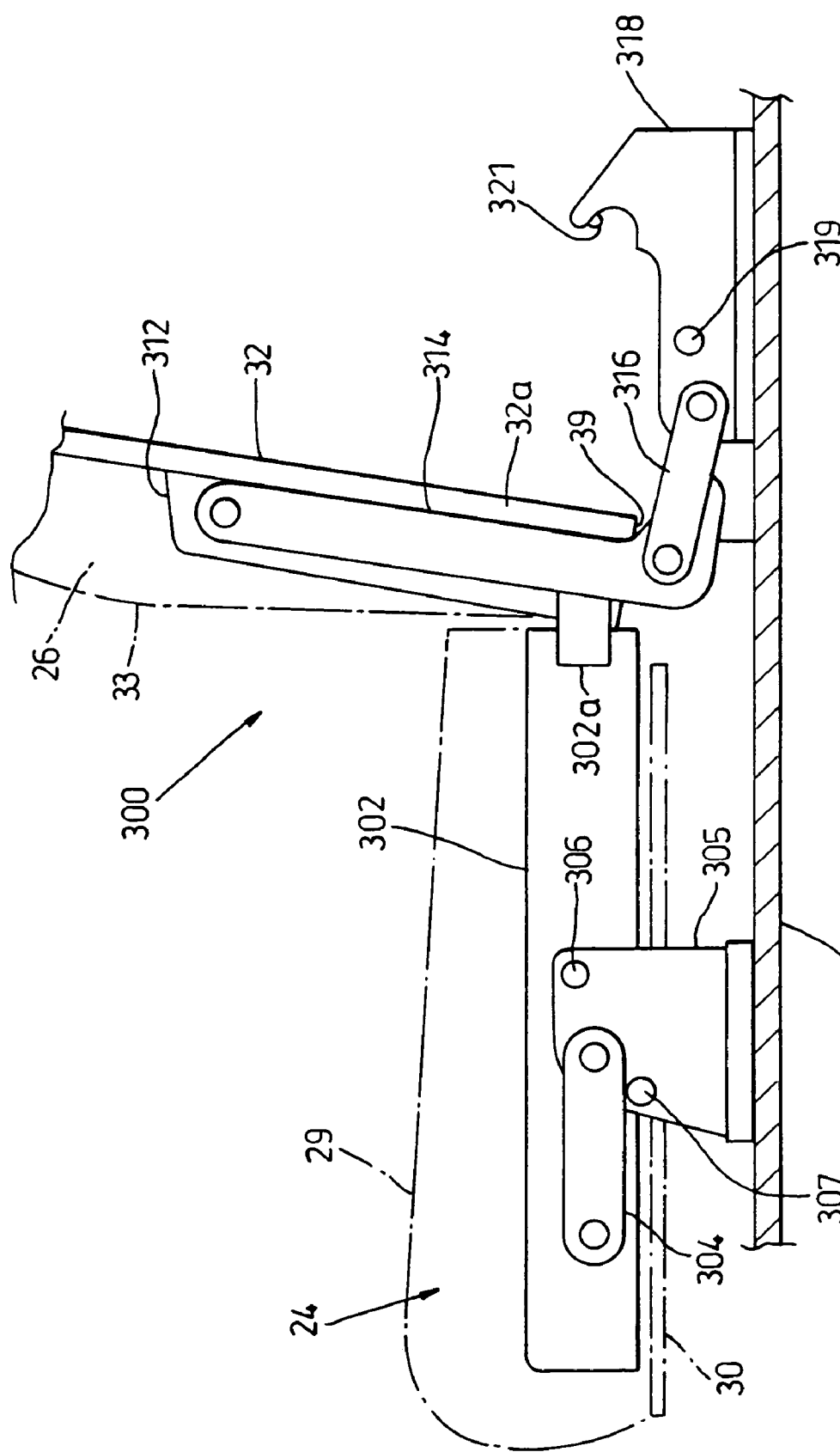
FIG. 9 is a diagrammatic view similar to that of FIG. 8 but showing the seat support mechanism in a seat forward position.
Figure 10:
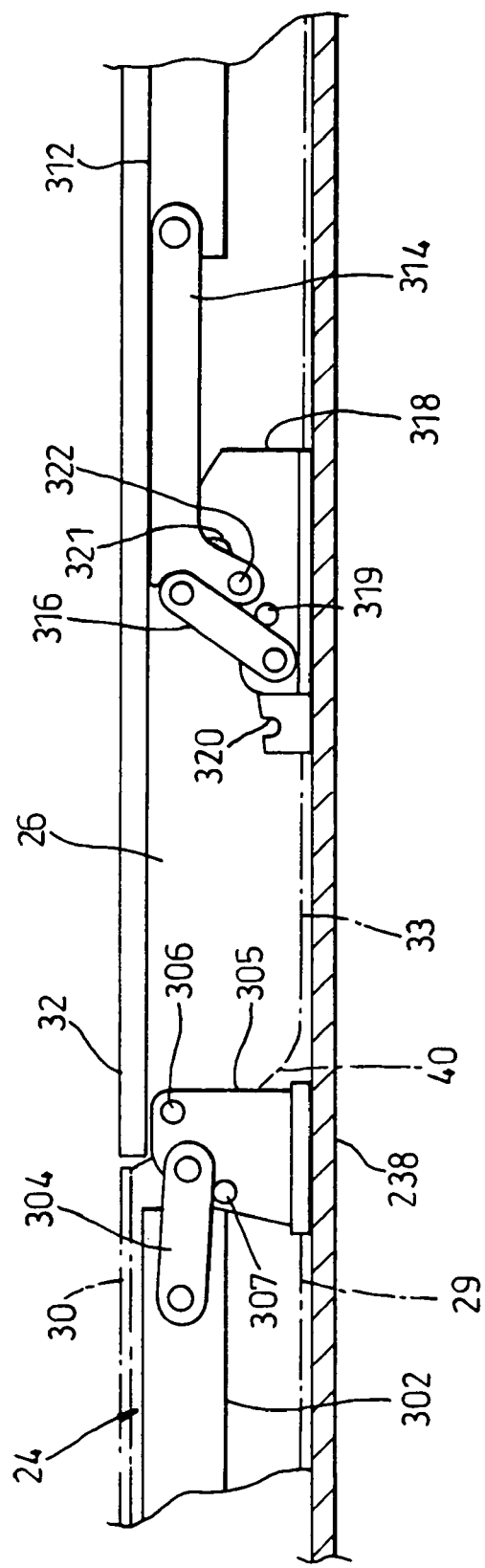
FIG. 10 is a diagrammatic view of the seat support mechanism shown in FIGS. 8 and 9 when in a stowed position.

FIGS. 8 to 10 show in a diagrammatic form the operation and structure of the seat support mechanism forming part of a foldable seat assembly 300 of the type used to form the third row seating 16. However, such a seat support mechanism could also be used for any seat requiring to be folded from a seating position to a stowed position and requiring forward and rearward seating positions. As previously discussed the third row seating 16 comprises two separate foldable seat assemblies 300. Since these can be substantially identical, only will be described in detail. The seat assembly 300 includes the seat cushion 24 with its upper seating surface 29, flat base surface 30, front edge 41 and rear edge 42 and the backrest 26 with its seating surface 33, rear surface 32, lower end 39 and upper end 40. The seat cushion 24 and the backrest 26 are selectively connected together by a releasable locking means. For ease of understanding the headrest 28 is omitted.

The seat cushion 24 includes a cushion support frame 302 to which is fastened the platform 30 and a seat pan (not shown) used to support a foam seating pad 303. The support frame 302 is pivotally connected near to a front edge to the floor structure 238 by a front support arm 304 on each side of the seat cushion 24 and is connected at a rear edge thereof to a backrest support frame assembly 310 by the releasable locking means. Each front support arm 304 is pivotally connected at one end to the cushion support frame 302 and at an opposite end to a front seat bracket 305, rotational movement of the front support arm 304 being limited by an upper end stop 306 and a lower end stop 307.

The backrest frame assembly 310 comprises a support frame 312 and an 'L'-shaped support leg 314 on each side of the backrest 26. Each support leg 314 is pivotally connected near one end to the support frame 312 and at an opposite end to the floor structure 238 by a rear support arm 316. Each rear support arm 316 is pivotally connected at one end to one of the support legs 314 and at the opposite end to a rear seat bracket 318. An end stop 319 on each rear seat bracket 318 limits the rotation of the associated rear support arm 316 in one direction. Each rear support bracket 318 is also used to fastened front and rear latching means 320, 321 to the floor structure 238. The front and rear latching means 320, 321 are arranged to selectively latch with a latching pin 322 fastened to a toe portion of each support leg 314 and are used to hold the seat assembly in one of its two normal seating positions. The front and rear support arms 304, 316 and the front and rear latching means 320, 321 form a seat position adjustment mechanism that is designed to allow the seat assembly 300 to be used in forward and rearward positions.

Figure 8A:
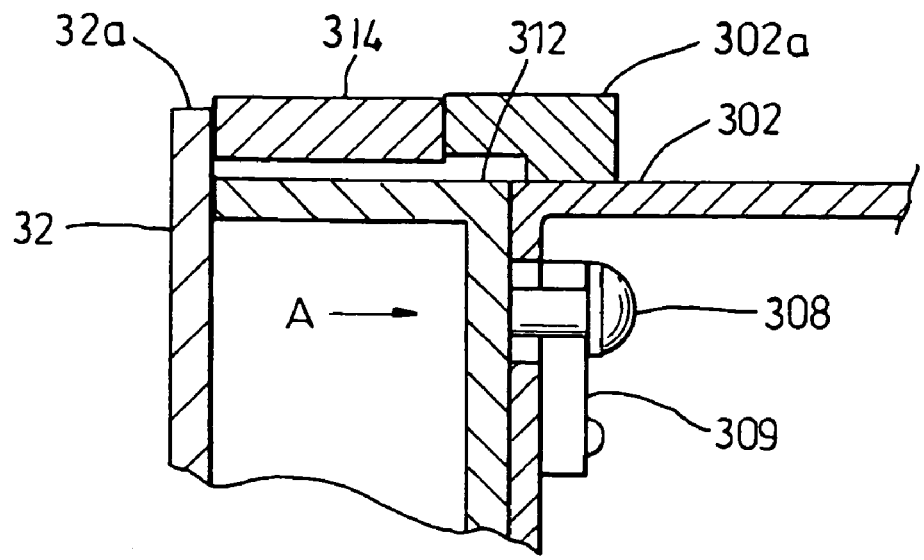
FIG. 8A is a partial cross-section on the line X—X on FIG. 8.
Figure 8B:
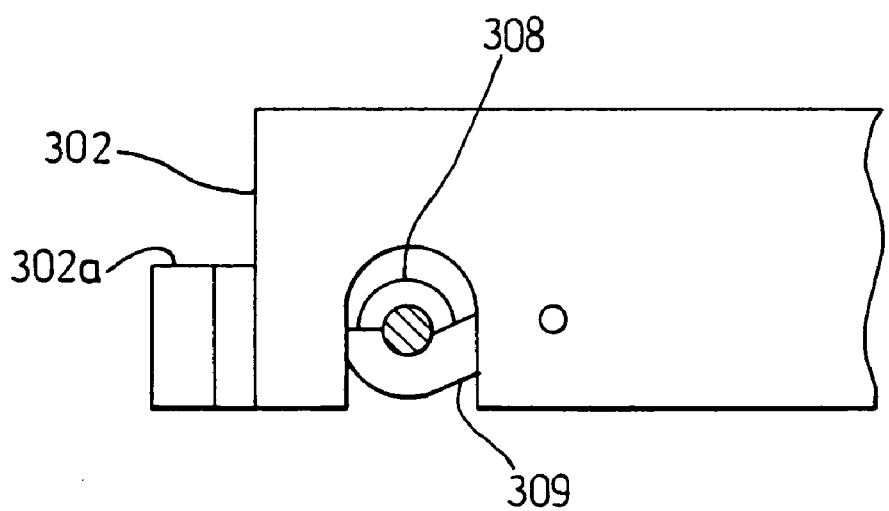
FIG. 8B is a view in the direction of arrow 'A' on FIG. 8A of part of the seat cushion frame.

As best seen with reference to FIGS. 8A and 8B, the releasable locking means includes a locking pin 308 fastened to the backrest support frame 312 and a lock assembly having a movable locking arm 309 movably connected to the cushion support frame 302. A block 302a is attached to each side of the cushion support frame 302 to trap the legs 314 against a panel member 32a forming the rear surface 32.

In FIG. 8, the seat assembly 300 is in a rearward seating position corresponding to the position shown in FIG. 1A. The seat cushion 24 is firmly connected to the backrest 26 by the releasable locking means and the front and rear support arms 304 and 316 are arranged to position the seat cushion 24 in a rearward and raised position. Each front support arm 304 is supported by its respective upper end stop 306, each rear support arm 316 is supported by its respective end stop 319 and the latching pins 322 are latched with the rear latching means 321 (FIG. 9). The load of a passenger sitting on the seat is therefore transferred from the seat cushion 24 and backrest 26 into the floor structure 238 via the front and rear support arms 304 and 316, the end stops 306, 319 and the front and rear support brackets 305 and 318.

As previously described the seat assembly is movable into the forward seating position shown in FIG. 9, corresponding to the position shown in FIG. 1B. This is done by releasing the rear latching means 321 to allow the latching pins 322 to be disengaged when a forward force is applied to the seat cushion 24 or the backrest 26. This causes the front and rear support arms 304 and 316 to rotate from the positions shown in FIG. 8 to the positions shown in FIG. 9. Because the seat cushion 24 and the backrest 26 are locked firmly together by the releasable locking means, they move as one in an arc determined by the lengths and relative positions of the front and rear support arms 304 and 316.

In the forward position the load of a passenger sitting on the seat assembly 300 is supported at the front by the front support arms 304, the lower end stops 307 and the front support brackets 305. At the rear the load is supported by the support legs 314, the latching pins 322, the front latching means 320 (with which the latching pins 322 are now engaged) and the rear support brackets 318.

In addition to the movement of the seat assembly 300 from a forward to a rearward seating position, the seat support mechanism also allows the seat assembly to be folded into the stowed flat configuration as shown in FIG. 10. Starting from one of the two normal seating positions previously described, this is achieved by first releasing the releasable locking means by moving the locking arms 309 which allows the locking pins 308 to escape when the rear edge 42 of the seat cushion 24 is lifted. Because the seat cushion 24 is pivotally connected to the floor structure 238, it can be freely rotated in an anti-clockwise direction about an axis close to its front edge 41 from the normal seating position into the stowed position. In the stowed position, the platform 30 of the seat cushion 24 is arranged substantially horizontally and faces upwards and the seating surface 29 faces downwards and is arranged in close proximity to the floor structure 238. The backrest 26, being no longer fastened to the seat cushion 24, is now free to rotate relative to the support legs 314. However mere rotation of the backrest 26 will not result in the required flat floor. Therefore the support legs 314 are released from the latching means 320 or 321, thereby allowing the support legs 314 to rotate relative to the rear support arms 316, the rear support arms 316 to rotate relative to the rear support brackets 318 and the backrest 26 to rotate relative to the support legs 314.

Rotation of the backrest 26 in an anti-clockwise or forward direction initiates a compound motion in which the support legs 314 rotate in a clockwise direction relative to the rear support arms 316 so that, instead of being arranged in an upward direction from the floor structure 238, they extend substantially parallel to the floor structure 238 and the lower end 39 of the backrest 26 moves in a rearward direction. When the backrest has been fully rotated forward, the upper end 40 of the backrest 26 is located behind the folded seat cushion 24 and the rear surface 32 of the backrest 26 faces upwards and is aligned with the platform 30 of the seat cushion 24 to form the continuous load bearing surface.

To restore the foldable seat assembly 300 to one of its normal seating positions, the backrest 26 is first repositioned and latched into one of its two positions and then the seat cushion 24 is folded back so that it re-engages with the releasable locking means.

Various grab handles may be provided to assist with the manoeuvring of the seat cushion 24 and the backrest 26. Also, the locking means and the latching means may be releasable by a number of means including, but not limited to, mechanical cables, mechanical linkages or electrically operable means.

In summary, there is shown a novel foldable seat assembly 300 that can be moved between forward and rearward position to suit different sized passengers and can be folded into a stowed position in which a flat load bearing surface is produced, a re-configurable seat assembly 200 that can be moved from a normal seating configuration into several alternative configurations including a raised table configuration, a folded forward configuration and a folded flat configuration and a motor vehicle 10 utilising the novel and inventive features of both types of seat assembly to provide a multi-functional seating arrangement.

It will appreciated by those skilled in the art that the arrangements described herein are given by way of example and that modifications and alternative arrangements could be constructed that fall within the scope of this invention as defined by the accompanying claims.

What is claimed is:

1. A foldable seat assembly for a motor vehicle, the seat assembly being movable between a normal passenger seating position and a stowed position and comprising a seat cushion having an upper seating surface and a generally flat base surface, the seat cushion being mounted for pivotal movement about a front transverse axis such that the seat cushion can be folded forward from a normal position corresponding to the normal passenger seating position of the seat assembly into a stowed position corresponding to the stowed position of the seat assembly in which the base surface faces upwards, and a backrest connected to the seat cushion and extending upward from the seat cushion when the seat assembly is in the normal seating position, the backrest having a lower end, an upper end, a front seating surface and a generally flat rear surface and being movable from a normal position corresponding to the normal passenger seating position of the seat assembly into a stowed position corresponding to the stowed position of the seat assembly, the lower end of the backrest being arranged to move rearwards as the backrest is moved from its normal position into its stowed position such that, in the stowed position, the backrest lies behind the folded seat cushion, the arrangement being such that the upper end of the backrest folds forwards as the lower end of the backrest moves rearwards during movement of the backrest from its normal position into its folded position so that, when the seat assembly is in the stowed position, the rear surface of the stowed backrest lies immediately behind the base surface of the folded seat cushion and the continuous load bearing surface.

2. The seat assembly as claimed in claim 1, the seat assembly further comprising a position adjustment mechanism arranged to facilitate movement of the seat cushion and backrest between a forward seating position and a rearward seating position.

3. The seat assembly as claimed in claim 2 wherein the position adjustment mechanism is arranged such that the seat cushion and the backrest are lower in the forward seating position than in the rearward seating position.

4. The seat assembly as claimed in claim 2 wherein the position adjustment mechanism includes a latching means to selectively latch the seat cushion and backrest in the forward and rearward seating positions.

5. The seat assembly as claimed in claim 1 wherein the seat cushion is connected to the backrest by a releasable locking means.

6. The seat assembly as claimed in claim 1 wherein the backrest includes a backrest frame assembly comprising a support frame and a pair of support legs, each of the support legs being pivotally connected to the support frame and in use connecting the support frame to a structural part of the motor vehicle.

7. The seat assembly as claimed in claim 6 wherein a combination of rotation of the support legs relative to the structural part of the motor vehicle and rotation of the support frame relative to the support legs produces the rearward movement of the lower end of the backrest.

8. The seat assembly as claimed in claim 6, the seat assembly further comprising a position adjustment mechanism arranged to facilitate movement of the seat cushion and backrest between a forward seating position and a rearward seating position, each of the support legs being in use attached to the structural part of the motor vehicle by means of a support arm forming part of the position adjustment mechanism.

9. The seat assembly as claimed in claim 8 wherein the position adjustment mechanism comprises a pair of front support arms to pivotally connect the seat cushion near to a front edge thereof to the structural part of the motor vehicle and a pair of rear support arms to pivotally connect the support legs to the structural part of the motor vehicle.

* * * * *